(12) United States Patent
Antypas

(10) Patent No.: US 8,910,904 B2
(45) Date of Patent: Dec. 16, 2014

(54) ENGINE ATTACHMENT PYLON

(71) Applicant: Airbus Operations SAS, Toulouse (FR)

(72) Inventor: Jerome Antypas, Plaisance du Touch (FR)

(73) Assignee: Airbus Operations (SAS), Toulouse (FR)

( * ) Notice: Subject to any disclaimer, the term of this patent is extended or adjusted under 35 U.S.C. 154(b) by 68 days.

(21) Appl. No.: 13/777,514

(22) Filed: Feb. 26, 2013

(65) Prior Publication Data

US 2013/0221155 A1   Aug. 29, 2013

(30) Foreign Application Priority Data

Feb. 27, 2012   (EP) .................................... 12157059

(51) Int. Cl.
| | | |
|---|---|---|
| *B64D 27/02* | (2006.01) | |
| *B64D 29/04* | (2006.01) | |
| *B64D 27/26* | (2006.01) | |
| *B64D 27/10* | (2006.01) | |
| *B64D 27/14* | (2006.01) | |
| *B64D 27/00* | (2006.01) | |

(52) U.S. Cl.
CPC ................ *B64D 27/26* (2013.01); *B64D 27/10* (2013.01); *B64D 27/14* (2013.01); *B64D 2027/005* (2013.01); *Y02T 50/66* (2013.01)
USPC .......................................................... 244/54

(58) Field of Classification Search
CPC ........ B64D 27/10; B64D 27/14; B64D 27/16; B64D 27/26
USPC ...... 244/53 R, 54, 1 N; 248/554; 60/769, 796
See application file for complete search history.

(56) References Cited

U.S. PATENT DOCUMENTS 5,065,959 A  * 11/1991  Bhatia et al. .................... 244/54
2012/0006937 A1 * 1/2012  Lafont et al. .................... 244/54

FOREIGN PATENT DOCUMENTS

| EP | 0311155 | 4/1989 |
|---|---|---|
| EP | 0429100 | 5/1991 |
| EP | 0872662 | 10/1998 |
| FR | 2943623 | 10/2010 |

OTHER PUBLICATIONS

European Search Report, Jul. 18, 2012.

* cited by examiner

*Primary Examiner* — Fahd Obeid
*Assistant Examiner* — Magdalena Topolski
(74) *Attorney, Agent, or Firm* — Greer Burns & Crain, Ltd.

(57) ABSTRACT

An engine attachment pylon for mounting an aircraft engine to an aircraft structure while minimizing vibrations induced into the engine attachment pylon during flight and operation of the engine. The engine attachment pylon comprises a rigid box like structure housing a resonator which is tuned to attenuate tension and compression vibrations experienced by the engine attachment pylon. The engine attachment pylon is primarily used in combination within another identical engine attachment pylon, both being linked together on a vertical plane within the fuselage by a hinge like junction, and each engine attachment pylon being raised approximately 30° from the horizontal axis of the fuselage.

15 Claims, 3 Drawing Sheets ical axis (x). The description will be made using a conventional axis system, comprising a longitudinal (x), a horizontal (y), and a vertical (z) axis. The rear portion of the fuselage 10 comprises two engines 11, 12 each having a central longitudinal axis (a) parallel to the longitudinal axis (x) of the fuselage 10. In this example, each engine comprises a nacelle 13, 14 for housing a compressor and combustion chamber, and a pair of counter rotating open fan blades 15, 16 providing thrust to the aircraft. Each engine is attached to the fuselage by means of an engine
ENGINE ATTACHMENT PYLON

RELATED APPLICATIONS

The present application claims priority to European Patent Application filed on Feb. 27, 2012 with application number 12157059.2, the entirety of which is incorporated herein by reference.

BACKGROUND OF THE INVENTION

The present invention relates to an engine attachment pylon for attaching an aircraft engine to a fuselage of an aircraft.

A known engine attachment pylon of this type is described in FR2943623 (U.S. Published Application 2012/0066937). It is an object of this invention to provide an improvement of an engine attachment pylon as described in FR2943623 (U.S. Published Application 2012/0066937).

SUMMARY OF THE INVENTION

According to the first aspect of the invention there is provided an engine attachment pylon, for mounting an aircraft engine to an aircraft structure, comprising a rigid structure housing a dynamic mass absorber which is tuned to absorb vibrations of the aircraft engine; the rigid structure substantially forming a box and comprising a first and a second attachment means to connect the engine and the fuselage respectively.

According to a second aspect of the invention there is provided an engine attachment assembly comprising a rear portion of an aircraft fuselage, two aircraft engines, and two engine attachment pylons wherein each engine attachment pylon connects each engine to the fuselage and wherein the engine attachment pylons according to any of the preceding claims are arranged such that the engine attachment pylons are joined on a vertical plane (P) within the aircraft fuselage by a junction.

BRIEF DESCRIPTION OF THE DRAWINGS

The invention will now be described by way of example with reference to the accompanying drawings, of which.

DETAILED DESCRIPTION OF THE PREFERRED EMBODIMENTS

Figure 1:
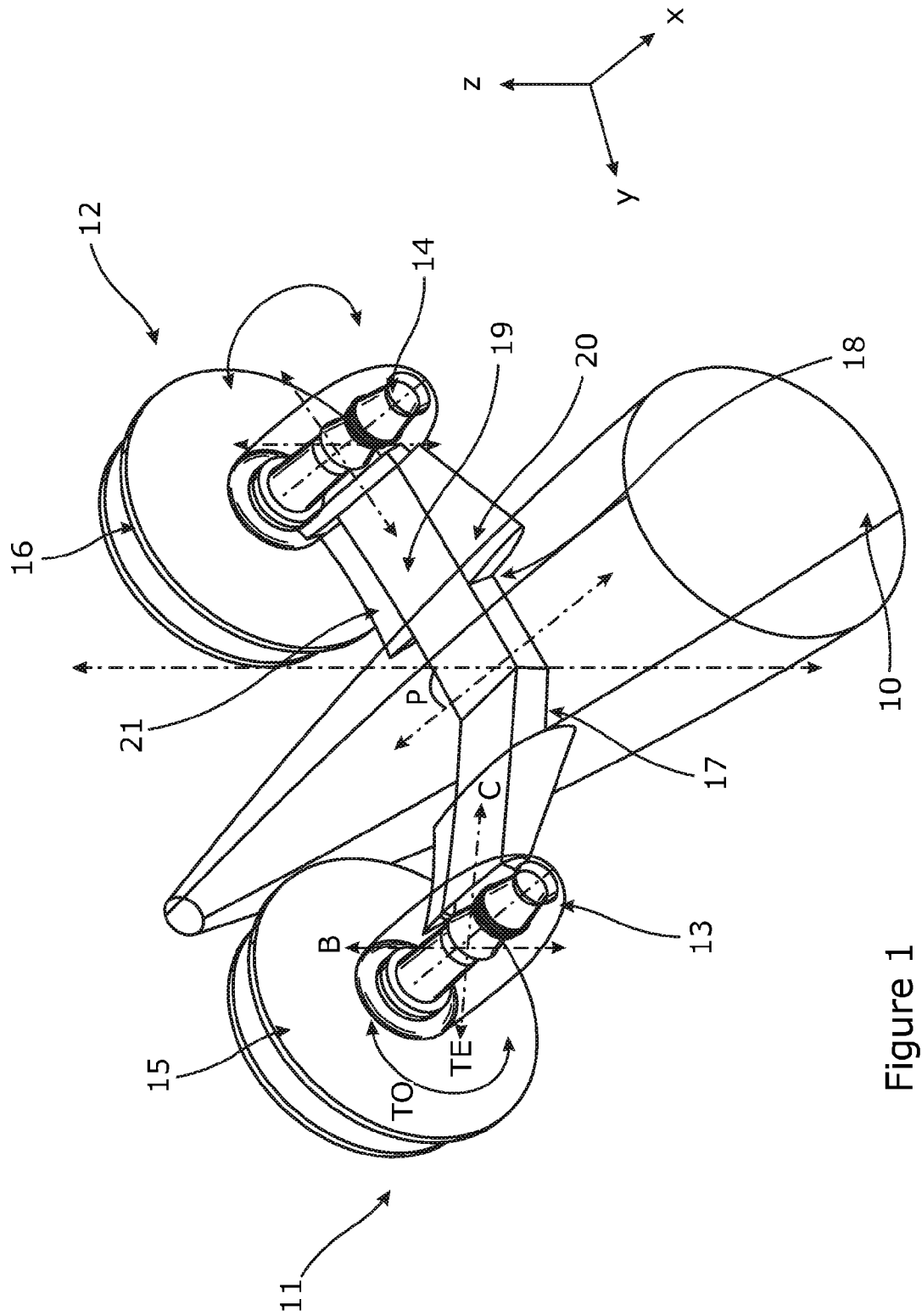
FIG. 1 is a perspective view of a rear portion of a fuselage having two engines attached to it by means of two engine attachment pylons.
Figure 2:
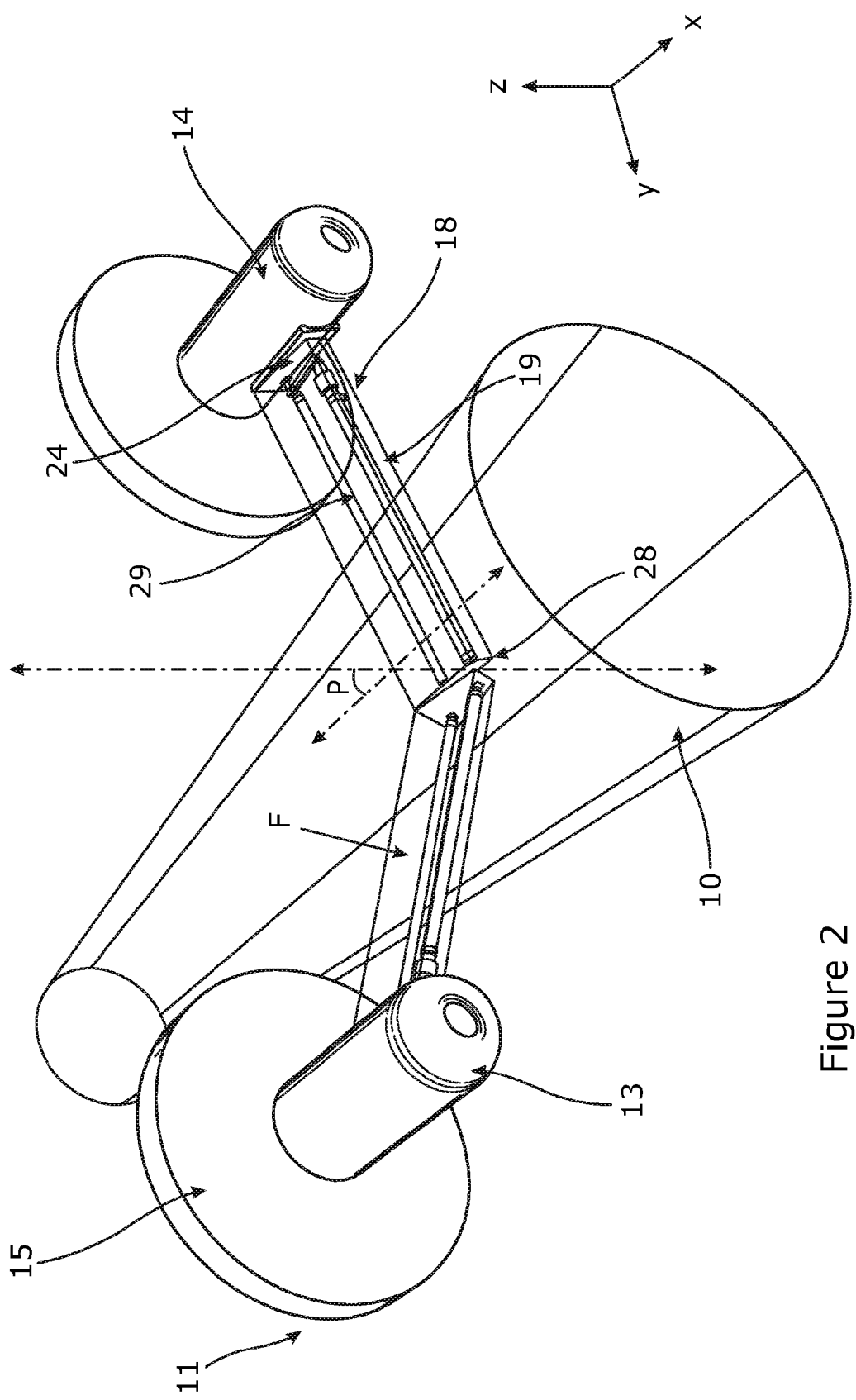
FIG. 2 is a similar view as FIG. 1 showing a dynamic mass absorber located inside each engine attachment pylon according to the present invention.
Figure 3:
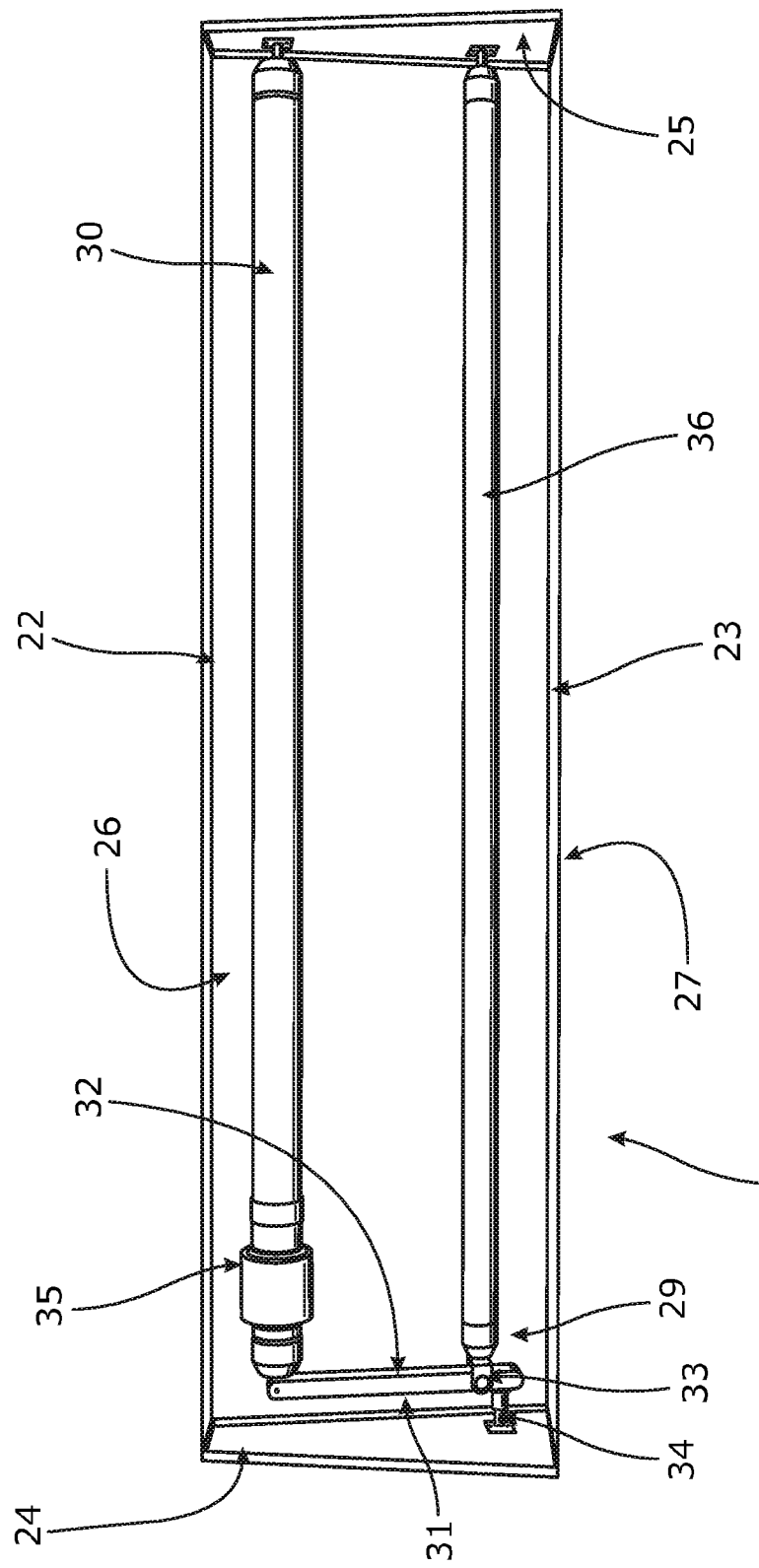
FIG. 3 is a detailed view of the resonator according to arrow F of FIG. 2.

With reference to FIG. 1, there is shown a rear portion of a fuselage 10 of an aircraft having a central longitudinal axis (x). The description will be made using a conventional axis system, comprising a longitudinal (x), a horizontal (y), and a vertical (z) axis. The rear portion of the fuselage 10 comprises two engines 11, 12 each having a central longitudinal axis (a) parallel to the longitudinal axis (x) of the fuselage 10. In this example, each engine comprises a nacelle 13, 14 for housing a compressor and combustion chamber, and a pair of counter rotating open fan blades 15, 16 providing thrust to the aircraft. Each engine is attached to the fuselage by means of an engine attachment pylon 17, 18. Each engine attachment pylon comprises a rigid structure 19 covered by aerodynamic fairings, in particular a front fairing 20 which forms a leading edge and a rear fairing 21 which forms a trailing edge of the pylon. With reference to FIG. 3, the rigid structure 19 forms substantially a box, which comprises a front spar 22, a rear spar 23, connected together by a first plate attachment means 24 and a second plate attachment means 25 extending perpendicularly between each spar, and sealed with an upper 26 and a lower panel 27. With reference to FIG. 2, both rigid structures 19 are joined together on a vertical plane (P) passing through the longitudinal (x) axis of the fuselage 10 by a junction 28. Each rigid structure passes through openings in the fuselage, as explained in FR2943643 (U.S. Published Application 2012/0066937) and incorporated in the present description by reference. In this example, the rigid structures are raised by 30° from the horizontal (y) axis. The engine attachment pylons 17, 18 interface at the uppermost edge second structural members so as to form the junction 28 which is substantially a hinge. The first attachment means 24 is conventionally rigidly attached to the engine nacelle. The rigid structure 19 is attached to the fuselage 10 internally by means of struts, as explained in FR2943643 (U.S. Published Application 2012/0066937), but not shown in the figures.

The engine attachment pylon 18 further comprises a dynamic mass absorber 29, or resonator, as shown in FIGS. 2 and 3, according to the present invention, housed within the rigid structure 19. The terms dynamic mass absorber and resonator may be used interchangeably. With reference to FIG. 3, the resonator 29 comprises a damping member 30 attached at one end to the second attachment means 25 and movably attached at the other end to a load transfer means 31. The load transfer means comprises 31 a lever 32 pivotally mounted around a pivot 33 and attached at one end to the damping member 30 and a fitting 34 at the other end. The fitting 34 attaches the lever 32 to the first attachment means 24. The damping member 30 has a narrow width compared to its length and extends, in-use, in the direction between the engine 11 and the fuselage 10. The damping member 30 comprises a lumped mass 35, or suspended ring mass, which is preferably located in the vicinity of the first attachment means 24. The pivot 33 is preferably a ball joint attaching the lever 32 to the end of a fixed member 36, having a narrow width compared to its length and which is attached at its other end to the second attachment means 25.

During flight and operation of the engines, vibrations comprising bending (B), torsion (TO), and tension (TE) and compression (C), as illustrated in FIG. 1, will be induced and transferred to the fuselage. The bending and torsion vibrations are attenuated by an arrangement of struts, which are not illustrated in the figure but are explained in FR2943643 (U.S. Published Application 2012/0066937). The struts serve to support the engine attachment pylons 17, 18 and reduce bending and torsion vibrations induced into the engine attachment pylon by the operation of the engine 11, 12 and during flight. The tension and compression vibrations in this example are attenuated by the resonator 29. Tension and compression vibrations are experienced by the fitting 34, and subsequently transferred to the damping member 30 by inducing oscillatory rotations in the lever 32 around the pivot 33. Then, the amplitude of the displacements at the attachment point of the damping member 30 to the lever 32 is attenuated by the inertia of the lumped mass 35, or ring mass, mounted onto the damping member 30, thus acting altogether as a damping force. The size of the ring mass 35 is chosen so that the dynamic mass absorber 29 can dissipate or absorb the vibration of the engine 11, 12. In particular, the weight of the lumped mass 35 is determined as a function of the amount of force required to react against the frequency of the vibrations seen at the location of the fitting 34.

The principal advantage of this invention is to provide an engine attachment pylon 17, 18 which prevents tension and compression vibration from the engines 11, 12 from propagating into the cabin area of the fuselage. Also, the use of the junction 28 in the present invention minimizes any vibrations from one engine attachment pylon 17 from propagating into the other engine attachment pylon 18. This is achieved because the junction 28 forms a hinge which isolates the movement from one engine attachment pylon 17 to the other 18.

Another advantage of this invention is that the position of the lumped mass 35 being located in the vicinity of the first attachment means 24 prevents bending vibrations from being induced into the engine attachment pylon 17 due to the existence of the resonator 29. Also, by implementing a lumped mass 35 as the means of damping, there is a reduced maintenance burden due to there being no moving parts and no hydraulic leakage.

Alternatively, the lumped mass 35 could be replaced by a hydraulic damper. The pivot 33 may also be changed such that it is not a fixed member 36 having a narrow width compared to its length and extending to the second structural member 25, but takes the form of a rigid strut attached between the upper 26 and lower panels 27, at the location of the pivot 33.

It will be appreciated that engine attachment configurations other than a rear mounted configuration with two engines mounted on engine attachment pylons 17, 18 raised by 30° from the horizontal (y) axis of an aircraft fuselage are possible. The engine attachment pylon according to the present invention could easily be adapted for other configurations. One such configuration would be to attach the second structural member to the fuselage. In this case, there is no need for a junction connecting the two engine attachment pylons and it would be appreciated that there would be a reduction in structural mass as a result. The engine attachment pylon could also be relocated to beneath the wing. In this case, the resonator within the engine attachment pylon would extend vertically in the direction between the engine and the wing.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An engine attachment pylon, for mounting an aircraft engine to an aircraft structure, comprising:
    a structure forming a box and comprising a first attachment member to connect to the engine and a second attachment member to connect to the fuselage; and,
    a dynamic mass absorber which is tuned to absorb vibrations of the aircraft engine, the dynamic mass absorber housed in the box and comprising a damping member suspended inside the structure and a lever, wherein the lever is pivotally mounted around a pivot, and connected at one end to a first end of the damping member and at the other end to a fitting mounted on one of the first attachment member or the second attachment member and wherein a second end of the damping member is attached to the other of the first attachment member or the second attachment member.

2. An engine attachment assembly comprising:
    a rear portion of an aircraft fuselage,
    two aircraft engines, and
    two engine attachment pylons according to claim 1, wherein each engine attachment pylon connects one engine to the fuselage and wherein the engine attachment pylons according to claim 1 are arranged such that the engine attachment pylons are joined on a vertical plane within the aircraft fuselage by a junction.

3. The engine attachment assembly according to claim 2, wherein the junction forms a hinge between the second attachment means of each engine attachment pylon at their uppermost edge when in-use.

4. The engine attachment pylon according to claims 1, wherein the damping member comprises a lumped mass.

5. An engine attachment assembly comprising:
    a rear portion of an aircraft fuselage,
    two aircraft engines, and
    two engine attachment pylons according to claim 4, wherein each engine attachment pylon connects one engine to the fuselage and wherein the engine attachment pylons according to claim 4 are arranged such that the engine attachment pylons are joined on a vertical plane within the aircraft fuselage by a junction.

6. The engine attachment assembly according to claim 5, wherein the junction forms a hinge between the second attachment means of each engine attachment pylon at their upper most edge when in-use.

7. The engine attachment pylon of claim 1, wherein the damping member extends in a direction between the engine and the fuselage.

8. The engine attachment pylon of claim 1, wherein the pivot is disposed between the connection of the lever to the fitting and the connection of the lever to the damping member.

9. The engine attachment pylon of claim 1, wherein the pivot is a ball joint in a fixed member.

10. The engine attachment pylon of claim 9, wherein the damping member and the fixed member are attached to the second attachment member.

11. The engine attachment pylon of claim 10, wherein the pivot is disposed between the connection of the lever to the fitting and the connection of the lever to the damping member.

12. The engine attachment pylon of claim 11, wherein the damping member extends in a direction between the engine and the fuselage.

13. The engine attachment pylon of claim 1, wherein the damping member is attached to the second attachment member and the fitting is attached to the first attachment member.

14. An engine attachment pylon, for mounting an aircraft engine to an aircraft structure, comprising:
    a structure forming a box and comprising a first attachment member to connect to the engine and a second attachment member to connect to the fuselage; and,
    a dynamic mass absorber which is tuned to absorb vibrations of the aircraft engine, the dynamic mass absorber housed in the box and comprising a damping member suspended inside the structure and a lever,
    wherein the lever is pivotally mounted around a pivot, and connected at one end to a first end of the damping member and at the other end to a fitting mounted on one of the first attachment member or the second attachment member and,
    wherein the damping member extends in a direction between the engine and the fuselage.

15. An engine attachment pylon, for mounting an aircraft engine to an aircraft structure, comprising:

a structure forming a box and comprising a first attachment member to connect to the engine and a second attachment member to connect to the fuselage; and, a dynamic mass absorber which is tuned to absorb vibrations of the aircraft engine, the dynamic mass absorber housed in the box and comprising a damping member suspended inside the structure and a lever, wherein the lever is pivotally mounted around a pivot, and connected at one end to a first end of the damping member and at the other end to a fitting mounted on one of the first attachment member or the second attachment member and, wherein the pivot is disposed between the connection of the lever to the fitting and the connection of the lever to the damping member.

* * * * *